Figure 1:
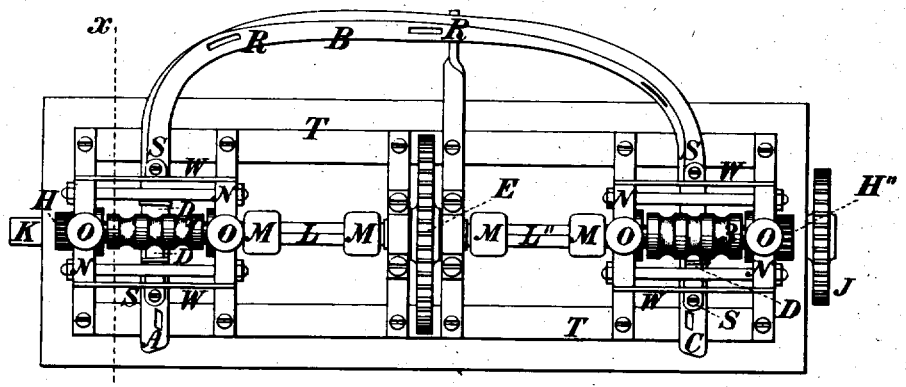

2 Sheets—Sheet 1.

H. B. COMER,

Assignor, by mesne assignments, to CAMBRIA IRON CO.

Machinery for Rolling Wire.

No. 9,321. Reissued July 27, 1880.

WITNESSES.

J. Thorndon Psew.

J. Walter Douglass.

INVENTOR.

Henry B. Comer.

by Henry Baldwin Jr.

Atty.

2 Sheets—Sheet 2.

H. B. COMER,

Assignor, by mesne assignments, to CAMBRIA IRON CO.

Machinery for Rolling Wire.

No. 9,321. Reissued July 27, 1880.

WITNESSES.

J. Snowden Bell

J. Walter Douglass.

INVENTOR.

Henry B. Comer.

by Henry Baldwin Jr.
Atty.

UNITED STATES PATENT OFFICE.

HENRY B. COMER, OF JOHNSTOWN, PENNSYLVANIA, ASSIGNOR, BY MESNE ASSIGNMENTS, TO CAMBRIA IRON COMPANY, OF SAME PLACE.

MACHINERY FOR ROLLING WIRE.

SPECIFICATION forming part of Reissued Letters Patent No. 9,321, dated July 27, 1880.

Original No. 148,811, dated March 24, 1874. Application for reissue filed February 12, 1879.

*To all whom it may concern:*

Be it known that I, HENRY B. COMER, formerly of Worcester, Massachusetts, but now residing at Johnstown, Pennsylvania, have invented certain new and useful Improvements in Rolls for Rolling Iron, Steel, and other Metals; and I do hereby declare the following to be a full, clear, and exact description of the same.

This invention relates to the rolling of metals by a continuous operation, according to which the forward end of the metal rod delivered by one pair of rolls of a series or train is conducted to the next succeeding pair of rolls before the body of the metal rod leaves the preceding pair, so that the metal is subjected simultaneously to the action of several pairs of rolls of the series or train. These successive pairs of rolls, in the order of work, have grooves, which decrease progressively in size, so as to reduce the cross-section of the metal rods, and their surfaces are caused to move with speeds or velocities which are progressively increased, so as to correspond substantially or practically with the increase in the length of the rod incident to its reduction in cross-section.

The invention consists, mainly, of certain combinations and arrangements of the rolls of the series or train by which the continuous rolling is effected. These combinations are specified in the claims at the close of the annexed description, and each involves two or more of the following characteristics, viz: first, the arrangement of the rolls of the series or train in pairs which are horizontal and end to end, as distinguished from the arrangement of some of the pairs of rolls of the series with their axes vertical, and from the arrangement of the pairs of rolls in advance of each other; second, the driving of the rolls by gearing, which causes the surface speed or velocity of some of the rolls to be faster than that of the next preceding pair without necessarily increasing the diameters of the former; third, the construction of some of the rolls of the series or train of greater diameter than others, so that an increase in the surface speed or velocity of such rolls relatively to the surface speed or velocity of the next preceding pair is obtained without necessarily increasing the speed by a variation of the gearing; fourth, the connection of succeeding pairs of rolls by twisted guides, so that the metal is conducted from one pair of rolls to a succeeding pair, which are at a different level from the former and also endwise thereof.

In order that the invention may be fully understood, I have represented in the accompanying drawings and will proceed to describe the best mode of embodying my invention which I had devised at the date of the application for my original patent of which this is a reissue.

Figure 2:
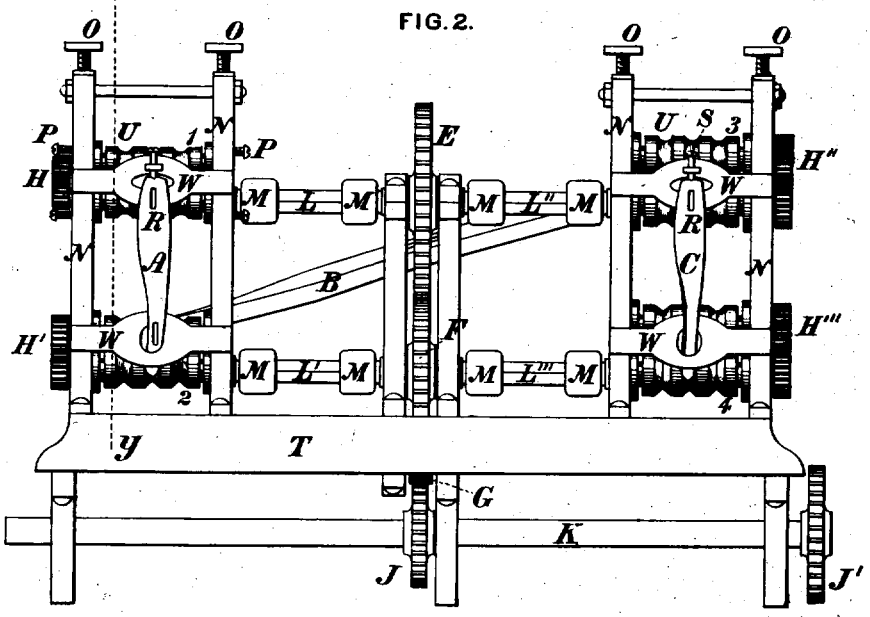
Figure 3:
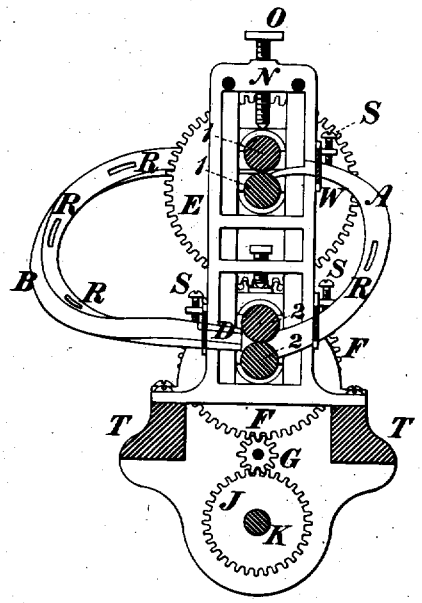

In the accompanying drawings, Figure 1 is a plan or top view of four pairs of rolls, with their housings, guides, and pinions, also the gear for driving the next set of four pairs of rolls on the main shaft; Fig. 2, a front elevation of the same, showing the main shaft and the gear; and Fig. 3, a cross-section on the line X Y of Fig. 2.

The drawings represent four pairs of rolls in two pairs of housings, and show the two methods of increasing the speed.

As my machine is designed to roll long strips, bars, or rods of metal, I shall, of course, use a great many more rolls than are shown in the drawings—say sixteen—but as any attempt to show in the drawings the whole number of rolls employed would be a simple duplication of what is already shown, I will proceed with the description, based on the figures as so shown.

No. 1 is the pair of rolls through which the iron first passes from the furnace; No. 2, the pair through which it next passes; No. 3, the next; No. 4, the next in order, and so on.

A B C are the guides which carry the metal being rolled from one pair of rolls to the next pair through which it is to be passed. D are breakers, one of which is on the receiving end of each guide. E F G H H′ H″ H‴ are pinions for completing connections of power from point to point. J and J′ are gear-wheels on the main shaft K, and L L′ L″ L‴ are breaking-spindles. M M are sliding sleeves on said spindle. N N are the housings for the rolls; O, screws for adjusting the bearings of the rolls vertically; P, screws for adjusting the position of the rolls in their bearings laterally. R are slits or openings in the guides to permit the escape of scale peel and fin. S are screws for setting the guides and for securing them in place. T is the bed-plate. U are additional grooves in the rolls. W are supports for the guides.

To enable others skilled in the art to make and use my invention, I will describe its construction and operation, and will show the process of rolling to a finish any desired bar or rod of merchantable wire or rod by my improved machinery.

To roll long rods I prefer to have about sixteen pairs of rolls, arranged end to end, two pair in each housing, as shown in Fig. 2 of the drawings, and in addition a pair of finishing-rolls. Power is applied to the main shaft K, which has four gear-wheels situated upon it, as at J, to run the whole sixteen pairs of rolls, one gear for every four pairs of rolls, arranged substantially as shown in the drawings, where gear-wheel J′ is out of place, as it bears the same relative position to the rolls which it runs as J has to those which it runs. When shaft K begins to revolve it imparts motion to the rolls by gear J through pinions E, F, G, and H H′, &c., the connections being shown in the drawings. Pinion E is, say, one-quarter larger in circumference than F, so that as they gear one into another the rolls No. 2 revolve one-quarter faster than rolls No. 1, rolls Nos. 1 and 2 being of the same diameter; and rolls No. 3, being run by pinion E, which also runs No. 1, would, were they of the same size or diameter as No. 1, run at the same speed; but the diameters of No. 3 are each one-half more than those of No. 1. They therefore traverse at their surfaces one-half faster than No. 1 and one-quarter faster than No. 2. No. 4 are of the same diameters, respectively, as No. 3, and, being turned by pinion F, which turns one-quarter faster than pinion E, they travel one-quarter faster than No. 3. The speed thus increases progressively from No. 1 to No. 4.

The second four pairs of rolls (not shown in the drawings) are of the same sizes and diameters, respectively, as the pairs of rolls last described, and the increase of speed from the first pair of rolls to the fourth pair is relatively the same; but the speed of all is increased over that of the first four pairs by the gear-wheel J′ on the main shaft K, which drives them. This gear-wheel J′ is about twice as large as gear-wheel J, which drives the first four pairs. The speed thus imparted, decreased one-fourth by large pinion corresponding to E, gives to No. 5, the diameters of which are the same, respectively, as No. 1, a one-quarter increase of speed over No. 4. When the rolls are set up they are designated by the numbers 1 to 16, if sixteen pairs are employed, and No. 5, above referred to, is therefore the fifth pair which the metal passes through, beginning at No. 1. The speed of the rolls is thus increased regularly and progressively from No. 1 to No. 8. At this point the increase is interrupted. By attaching a smaller gear to main shaft K, to drive pairs Nos. 9, 10, 11, and 12—say the same size as is required to run Nos. 1 to 4—Nos. 9 to 12 are run at a much less rate of speed than Nos. 5 to 8. In fact, they are run at the same rate as Nos. 1 to 4. The speed is then increased from No. 9 to No. 16 in the same way as from No. 1 to No. 8. The ratio of increase in speed of one pair of rolls over another can be fixed at will. I instance an increase of one-quarter simply for convenience of description. At the same time I prefer to increase at that rate, care being taken that in starting pair No. 1 at any certain rate of speed it will not, in the progressive increase, make the resultant increased speed so high as to prevent practical operation.

The guides A, B, and C are placed so as to guide the metal being rolled from No. 1 to No. 2, from No. 2 to No. 3, and so on up to 8. From No. 8 to No. 9 there is no guide, as it is at No. 9 that the decrease of speed occurs; and as the metal comes out of No. 8 faster than it is taken up by No. 9, slack is formed, and a guide would be an obstacle. Guides are also placed to guide or carry the metal from No. 9 to No. 10, and so on up to No. 16, from which the metal passes to the finishing-rolls, into which the operator inserts the end of it through a short guide.

The pairs of rolls numbered 1 to 8, inclusive, form one series, and those numbered 9 to 16, inclusive, form a second series.

The pairs of rolls contained between the pair having the lowest velocity and that having the highest resultant increase, I have denominated "a series."

The machinery, after being adjusted to the desired ratio of increase, is ready for operation.

A great object in this system of rolling is to get as many passes of the metal through the successive pairs of rolls as is possible while the metal retains its welding heat; and to attain this object it is desirable to run the first seven or eight pairs of rolls at as high a rate of speed as is consistent with practical working; and, in addition to getting a dense and high quality of iron or metal in this way, I am enabled to roll the metal after that to much smaller sizes than though it had only one, two, or three passes while a good welding-heat lasted. If the speed were regularly increased from No. 1 to No. 16 pairs of rolls, as has been the practice heretofore, and if, to secure the above-named object, Nos. 1, 2, 3, and 4 were run at a high rate of speed, the regular increase, as it reached Nos. 19 to 16, would make the speed so great as to be entirely impracticable for working purposes. By interrupting the increase between Nos. 8 and 9, or thereabout, I am enabled to take the fullest advantage of the welding heat by running the first eight pairs at the highest speed consistent with working at No. 8, where an operator seizes the end of the metal and passes it into No. 9. I am thus enabled to roll scrap-iron to No. 9 gage with the greatest ease, and to roll good iron billets to No. 12 gage. This can be done with billets which it was before impractical to roll lower than to size No. 6 by the gage.

The increase of speed from pair to pair is, as is well known, for the purpose, where metal is being rolled in a continuous mill, of taking up the increase in the length of the metal as it is rolled, and this increase varies with the draft of the rolls and the thickness of metal being rolled. The speed of rolls from No. 9 to No. 16 is then regulated so as not to make it so high as to prevent operation at No. 16. The metal, at a good welding heat, is passed from the furnace through a short guide, if desired, into rolls No. 1, thence through the successive rolls and guides to No. 8, which is running at a high rate of speed. Here an operator seizes the end as it comes out and puts it in No. 9, which runs at a lower speed than No. 8. The end of the metal being still in the first sets of rolls and retaining a high heat, as it has come up so quickly, then passes successively through the rolls and guides to No. 16, after which its end is caught and put through the finishing-rolls. The finished bar or rod is then ready for reeling. The slack formed between Nos. 8 and 9 is taken up by the operator stationed there.

The grooves in the rolls through which the metal passes may be of any desired shape; but I prefer the groove of pair No. 1 to be so shaped as to roll the metal into an oval in cross-section; the pair No. 2 so as to roll it square. These shapes are continued alternately through the whole series, and have, by experience, been found to reduce the metal quicker than any others. The guides constantly twist or change the position of the metal in its transit from roll to roll, so that when it is oval it comes to the square grooved rolls with its longer diameter perpendicular, or nearly so, and when it is square it comes to the oval groove with its sides in a perpendicular or vertical position. The grooves in the rolls for forming a square are V-shaped in cross-section, and the oval is half in each roll, its longest diameter being horizontal.

If it is desired to finish larger-sized bars or rods from the same-sized billets, a pair of finishing-rolls may be substituted after whatever pair of oval-grooved rolls meet the required size. Thus, if No. 4 is the required size square, we substitute a pair of finishing-rolls at No. 6, thus giving it an oval at No. 5 and the properly-sized finished round at No. 6, and so at any point for any required size or shape. The speed in this case is increased continuously from No. 1 to Nos. 9 or 10, if desired, even starting at No. 1 with a high rate of speed, with the same precaution as to resultant increase above named. The interruption of the increase of speed makes it possible to use almost any desired number of pairs of rolls, whereas by the old plan heretofore patented by me, dated March 29, 1859, the number of pairs of rolls was limited, as the increase of speed was progressive from first to last.

The great advantages of erecting two pairs of rolls in one pair of housings are economy in space and expense, saving in gearing, and convenience of adjustment, as the screws S can be loosened and the guides removed. The operator is thus enabled to look through the opening in the guide-supports thus left and adjust both grooves and rolls. The fact that the rolls are in line also facilitates this. Their being end to end also admits of lengthening the guides, so as to make the twist given to the metal being rolled more gradual, preventing it from choking and catching in its passage, while, as the rolls are in different horizontal planes, the pitch given to the guides immediately carries off the water which runs into them from what is poured on to cool the roll-grooves. The lack of this requisite is a great drawback to the horizontal guide, as the water stands in the guides and cools the hot metal, injuring its quality and its capacity for being rolled small. To avoid this difficulty, when the rolls are placed in front of each other they have to be placed very closely together, so as to make the intermediate guides as short as possible. This makes the twist of the guide very abrupt and makes it difficult to adjust the roll. Sometimes, despite every precaution, one roll will, from its great speed, pull the metal which does not come fast enough from the rolls supplying it. This breaks the metal so being rolled, as, the rolls being so close together, the strain is limited to a very short length of metal, while the distance of my rolls from each other and the length of my guides generalizes the strain over a greater length of metal, and a break is less likely to occur, and if the metal is drawn by the strain the diminution in its size is not material.

Through the interruption in the increase of speed above described the point where the rolls pull can be very easily discovered, and, through the rolls being open to access, very easily remedied, as also where the metal buckles or doubles up.

The guides A, B, and C are made in one or two parts, (I prefer to cast them of iron,) while, if the rolls are placed before each other, the guides have to be made in four or more pieces or sections and be put together after the rolls are set up, and between the rolls, in order to get their ends into the meeting-points of the rolls, and great trouble is experienced in securing them in place.

A detachable breaker, D, is placed at the receiving end of each guide, as shown, secured in place by a clamp, and they can be removed to adjust the position of the grooves and rolls. If the metal being rolled does not enter the receiving end of the guide fairly, it forces off the breaker D at once and escapes, instead of tearing up the guide or breaking some valuable part of the apparatus.

I am aware that the guide described in Patent No. 49,598, granted to George Bedson, August 22, 1865, is constructed so as to break open for the same purpose as my breaker, and therefore I do not claim, broadly, a breaker; but I do claim a detachable lip at the receiving end of the guide, as described and shown, so as to limit the damage in case of breakage to the breaker-plate alone, thus saving the guide, rather than, as in the patent referred to, subjecting the whole top plate of the guide to breakage.

The additional grooves U in the rolls prevent the water which is poured on to cool the bearings from flowing along the surface of the rolls and entering the guides, and by constructing the guide-supports W with openings opposite each of these grooves U they may be used to roll as the middle grooves wear out or become rough. Said openings will serve to introduce the guides.

The various series of pairs of rolls may be run or operated by different shafts, though it would not be so economical as the mode described.

Having thus described my invention, what I claim as new, and desire to secure by Letters Patent, is—

1. The combination, substantially as described, of the four pairs of rolls 1, 2, 3, and 4, about of the relative sizes shown and described, and driving-pinions E and F, the speed of the second pair being increased over that of the first by the differently-sized pinions, and the speed of the third over that of the second by increasing the diameters of the rolls of the third pair over those of the rolls of the second pair.

2. The combination of two pairs of grooved rolls, placed end to end in different horizontal planes and endowed with progressively-increasing velocity, and a curved twisted guide or guides for conducting the metal being operated upon from one pair to the other pair, substantially as described.

3. In a train of rolls, two series of pairs of rolls for rolling a continuous strip of metal, having grooves of constantly-diminishing size from the first pair of the first series to the last pair of the last series, and the several pairs of each series endowed with progressively-increasing velocities, but each successive series commencing at a lower velocity than that of the last pair of the series which preceded it, substantially as described.

4. The combination, substantially as before set forth, of the rolls of a train in a series of pairs of different diameters, arranged horizontally end to end, and having their surfaces driven with progressively-increasing speed alternately by an increase of the number of revolutions imparted by gearing and alternately by the increased speed of surface obtained by the increase of the diameter of the rolls of one pair relatively to the next preceding pair.

5. The combination of the detachable lip or breaker with the guide at its receiving-mouth, substantially as and for the purposes described.

H. B. COMER.

Witnesses:

J. SNOWDEN BELL,

I. WALTER DOUGLASS.